G. S. HIGGINSON.
DISINTEGRATING MACHINE.
APPLICATION FILED JUNE 14, 1915.

1,235,030.

Patented July 31, 1917.
3 SHEETS—SHEET 1.

Witnesses:
R. J. Dearborn
F. Graves

Inventor:
George Seymour Higginson
by C. W. Marshall
Attorney

UNITED STATES PATENT OFFICE.

GEORGE SEYMOUR HIGGINSON, OF LONDON, ENGLAND.

DISINTEGRATING-MACHINE.

1,235,030.

Specification of Letters Patent.

Patented July 31, 1917.

Application filed June 14, 1915. Serial No. 33,999.

*To all whom it may concern:*

Be it known that I, GEORGE SEYMOUR HIGGINSON, a citizen of the United Kingdom, residing at No. 86 Great Portland street, London, W., in the county of Middlesex, England, have invented a new and useful Disintegrating-Machine, of which the following is a specification.

This invention relates to a disintegrating, pulverizing, crushing, or the like machine with which materials such as minerals, stone, coal, coke, and the like can be reduced to a condition of fine dust or powder, of that type in which the material is fed through a hopper to the center of the casing of the machine and thence is caused to pass substantially radially between a fixed and a revolving disk, each of which is provided with concentric rings of projecting teeth, the teeth of one disk lying in the grooves between adjacent concentric rings of teeth of the other. My invention consists in providing parts which effect a preliminary shearing and crushing action thereby reducing the material to a size of particle suitable for being acted on by the said teeth, in forming or shaping the notches between the teeth of each ring in such a manner that the possibility of any particle avoiding the impulsive action of any ring of teeth is prevented and in means for giving easy access to the parts of the machine subjected to wear and tear.

Figure 1:
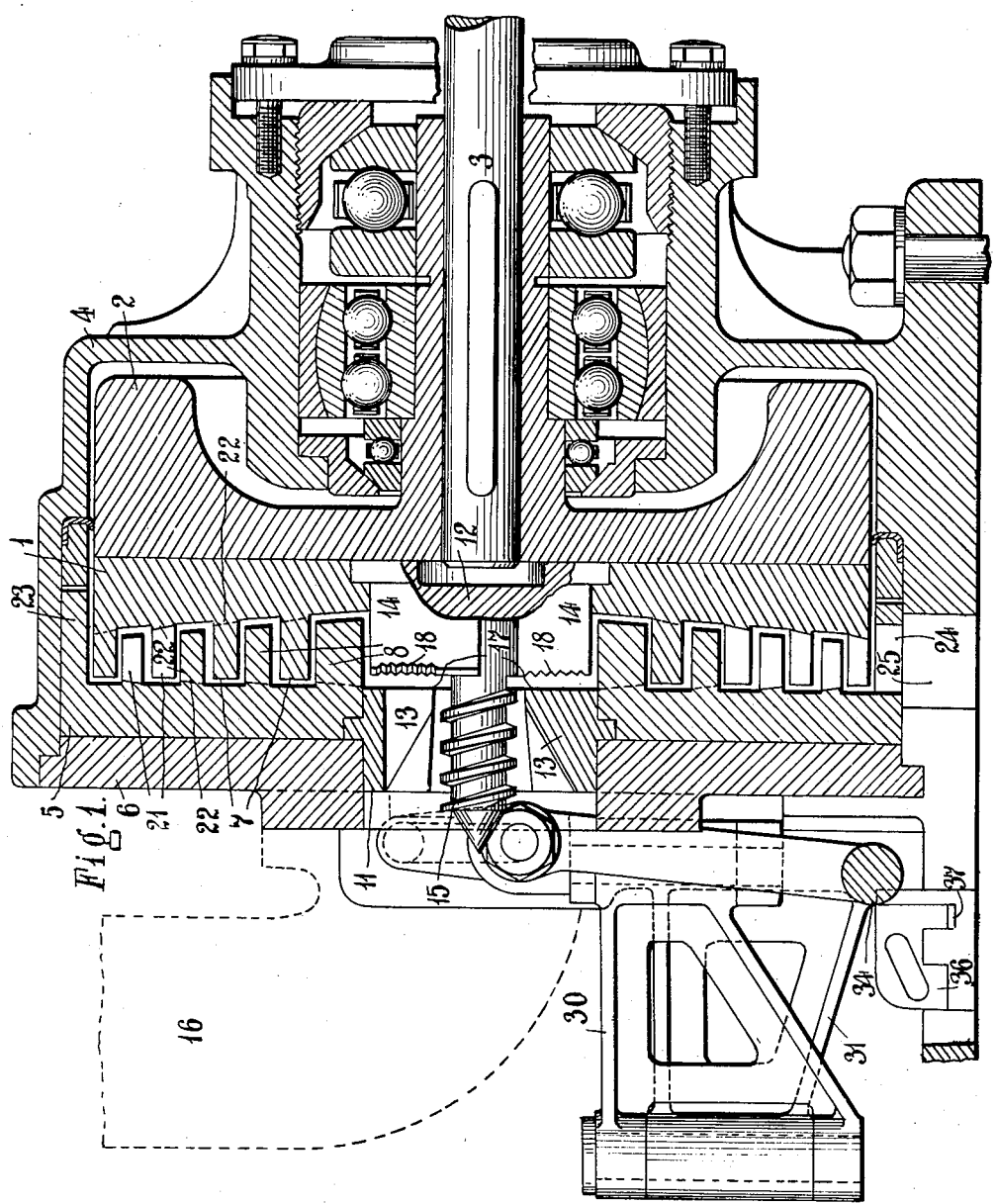
Figure 2:
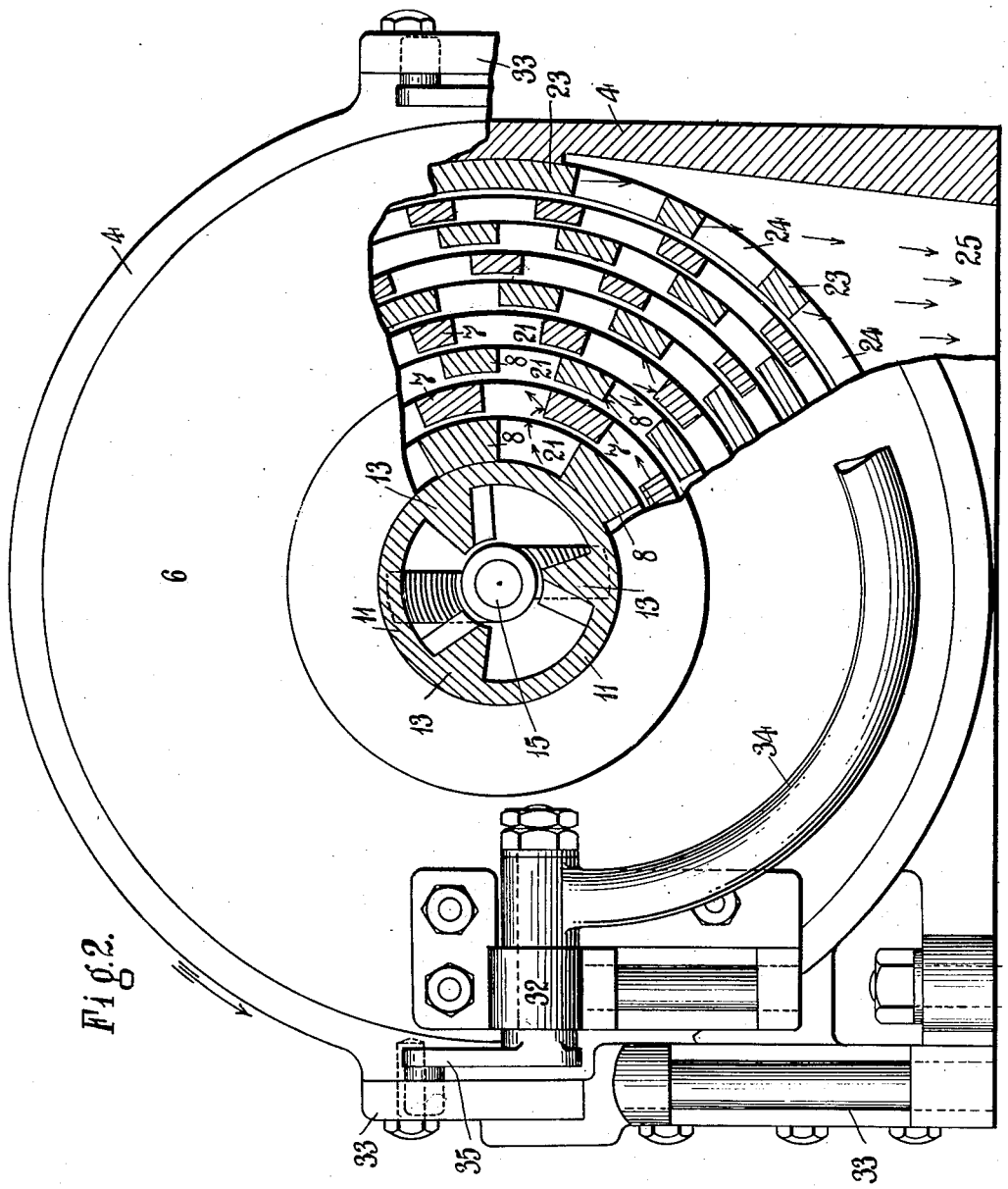
Figure 3:
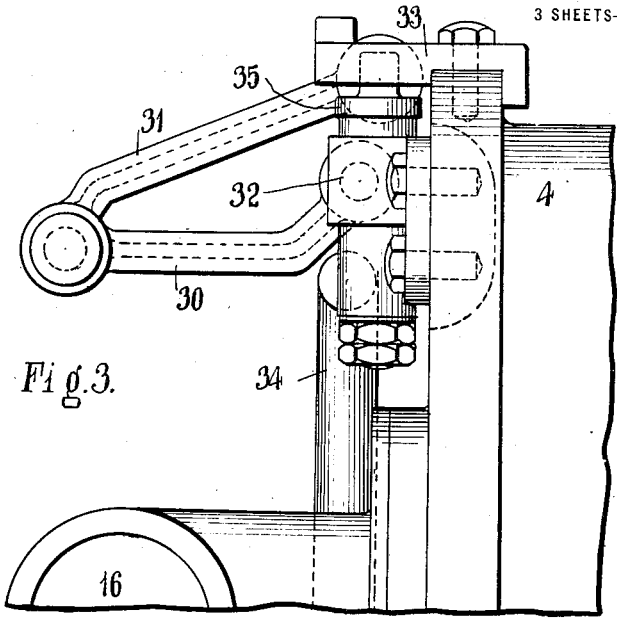
Figure 4:
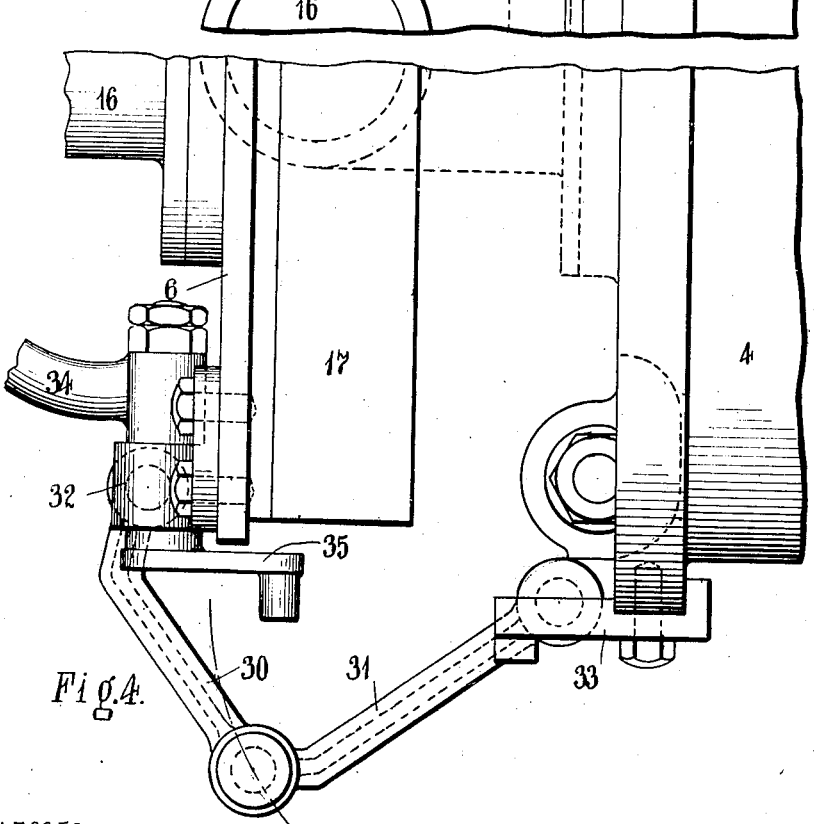

Figure 1 is a section through the axis of the machine. Fig. 2 is partly a section by a transverse plane passing through the teeth of the fixed and revolving disks, and partly an end elevation with the hopper and the brackets referred to hereinafter removed. Fig. 3 is a half plan, and Fig. 4 is a half plan showing the cover and fixed disk being swung outward from the casing of the machine.

The rotating disk 1 is detachably fastened to a disk or flywheel 2 suitably attached to the driving shaft 3. The fly wheel and shaft are inclosed in the casing 4, being suitably mounted on bearings as shown. The fixed disk 5 is detachably fastened to the cover 6 which closes the end of the casing 4. The teeth 7 and 8 projecting from the rotating and fixed disks respectively are disposed as shown in the drawings in a manner well known in general arrangement.

The parts which effect the preliminary shearing and crushing consist of an annular part 11 detachably fixed at the center between the fixed disk 5 and cover 6, and a part 12 detachably fixed between the rotating disk 1 and flywheel 2. The annular part 11 is formed with internal teeth 13 (three are shown on the drawing) chamfered toward the opening for admission of the material so as to offer less obstruction to its passage. The part 12 has auger-like teeth 14 (two are shown in the drawing) and a central nose piece 15 projecting into the annular part 11. The material is fed into a hopper 16 attached to the cover 6; it having been previously reduced in a crusher to pieces of size suitably to pass freely through the spaces inclosed by the aforesaid parts 11, 13 and 15. The central nose piece may be screwed to assist the passage of the material through the annular part 11. The axial distance between the fixed teeth 13 and the rotating auger-like teeth 14 is less than the average diameter of the lumps of the material. The lumps are sheared between the opposing edges of the fixed and rotating teeth. The end faces 17 of the fixed teeth are shown in Fig. 1 as plane surfaces at right angles to the axis of the driving shaft, while the end faces 18 of the rotating teeth are inclined in the circumferential direction to those of the fixed teeth, the space at the leading edges of the rotating teeth being greater than at the following edges. Any material caught between the end faces of the teeth is therefore rolled and crushed between the said end faces, and the material is further reduced in size of particle. The rotating teeth 14 may have their end faces 18 serrated concentrically as shown, to further assist in the reduction by crushing of the material. The end thrust due to the said crushing is taken up by ball thrust bearings.

The toothed disks 1 and 5 and the shearing and crushing parts 11 and 12 being all detachable, the size and arrangement of the teeth, notches, clearance spaces, etc., can be made suitable for effectively dealing with or treating any given material and also for producing any required fineness of resultant particle while the other portions of the machine will be the same for all materials.

To prevent the possibility of any material missing the impulsive effect of any ring of teeth in its passage from the center to the periphery, the notches 21 between adjacent teeth of the same ring are cut from the bottom of the groove immediately inside the ring to a point on the groove immediately outside the ring at a greater distance from the bottom of that groove than the clearance space between the faces of the teeth and the bottom of the groove, as shown at 22. The outside ring 23 of the fixed disk projects farther from the disk than the others, and is not notched but forms a rim which is pierced at intervals by apertures 24 along its lower half. The lower portion of the casing inclosing the fixed disk and outside ring 23 is cut away, and a passage 25 is formed communicating with the base. The apertures 24 may if required be pierced right around the outside ring 23, in which case the passage 25 extends completely around the casing. In operation, the material to be pulverized is fed into the hopper and passes into the spaces between the fixed annular part and the revolving central nose-piece, assisted by the screw or worm on the said nose-piece. The smaller pieces of the material fall through the space between the end faces of the fixed and revolving teeth, the larger portions are sheared between the opposing edges of the teeth, while the portions of the material too small to be sheared and too large to fall easily through the space are drawn in and crushed between the end faces of the fixed and revolving teeth 13 and 14. The material is ultimately forced by the revolving teeth 14 assisted by gravity and centrifugal effect into the notches between the teeth of the first ring on the fixed disk, thence into the notches between the teeth of the first ring on the revolving disk.

In Fig. 2 the parts are arranged for the motion of the revolving disk to be anticlockwise, and the surfaces of the teeth on which the material impinges are shown by the arrow heads which also show the direction of the material. As the said surfaces are all approximately radial to the axis of rotation, no part of the material when struck by them is deflected back toward the center but is cleared away always toward the periphery. It is impossible under working conditions for the machine to become choked up, or, in other words, it is independent of the feed. Material fed into the center of the disk occupies a certain volume, but the volume of the spaces in the various rings successively traversed by the material gradually increases. At whatever speed it may be found practicable to feed in the material at the center it is cleared away at an ever increasing velocity through an ever increasing space by the hammer like blows of the acting surfaces of the teeth until it reaches the periphery. The greater the number of rings on the disks the smaller the material is divided.

The cover 6 is secured in position at the end of the casing 4 by quickly operated mechanism, which affords an easy and rapid means of reaching the interior of the machine for cleaning purposes or for removing and replacing the toothed disks when worn. The cover 6 is supported at each side of the casing by means of two pairs of brackets 30 and 31 hinged together, and pivoted respectively to a bearing piece 32 on the cover and a bearing piece 33 on the casing. A curved handle lever 34 held in the bearing piece 32 operates crank arms 35, one at each side. The pins of the said crank arms engage in a groove formed in the bearing piece 33. The handle lever is held in position by a block 36 engaging with a guide piece 37. On removing the block and lifting up the curved handle lever, the crank pins are pressed against the grooves in the bearing pieces, and the cover is withdrawn: when the handle lever is horizontal the crank pins disengage from the grooves and the cover can be swung away from the end of the casing, permitting the toothed disks to be cleaned and removed, if required, from the cover and flywheel.

I am aware that prior to my invention disintegrators with rotating disks have been made. I therefore do not claim such a combination broadly; but

I claim:

1. In a disintegrating machine, a shaft, a rotary disk connected therewith having concentric rings of projecting teeth, a stationary disk having concentric rings of projecting teeth disposed between the rings of teeth on the rotary disk, combined with a shearing mechanism comprising an internally toothed stationary annular member and a rotary member having an external screw-thread within said annular member and a plurality of blades opposed to the inner end of the annular member.

2. In a disintegrating machine, a shaft, a rotary disk connected therewith having concentric rings of projecting teeth, a stationary disk having concentric rings of projecting teeth disposed between the rings of teeth on the rotary disk, combined with a shearing mechanism comprising an internally toothed stationary annular member and a rotary member having an external screw-thread within said annular member and a plurality of blades opposed to the inner end of the annular member and within the said concentric rings of teeth.

3. In a disintegrating machine, a casing, a removable cover at one end thereof, a shaft revolubly mounted in the casing and projecting through its other end, a flywheel affixed to said shaft within the casing, a rotary disk fastened to the fly-wheel, said rotary disk having concentric rings of projecting teeth on the side thereof away from the fly-wheel parallel with the axis of rotation, and a stationary disk fastened to the end cover of the casing, said stationary disk having concentric rings of projecting teeth also parallel with the axis of rotation on the side thereof away from the cover and arranged to be held by the cover between the rings of teeth on the rotary disk and means for supporting said cover arranged to permit it to be moved only in a direction parallel with said axis of rotation.

4. In a disintegrating machine, a casing, a removable cover at one end thereof, a shaft revolubly mounted in the casing and projecting through its other end, a fly-wheel affixed to said shaft within the casing, a rotary disk detachably fastened to the fly-wheel, said rotary disk having concentric rings of projecting teeth on the side thereof away from the fly-wheel parallel with the axis of rotation, and a stationary disk detachably fastened to the end cover of the casing, said stationary disk having concentric rings of projecting teeth also parallel with the axis of rotation on the side thereof away from the cover and arranged to be held by the cover between the rings of teeth on the rotary disk and means for supporting said cover arranged to permit it to be moved only in a direction parallel with said axis of rotation.

5. In a disintegrating machine a casing, a cover at one end thereof, supporting links connected with the cover and with the casing and arranged to hold the cover firmly against the end of the casing and to permit its removal from the casing, a shaft revolubly mounted in the casing and projecting from the end thereof opposite the removable cover, a fly-wheel affixed to said shaft within the casing, a rotary disk fastened to the fly-wheel, said rotary disk having concentric rings of projecting teeth on the side thereof away from the fly-wheel, and a stationary disk fastened to the end cover of the casing, said stationary disk having concentric rings of projecting teeth on the side thereof from the cover arranged to be held by the cover between the rings of teeth on the rotary disk and to be withdrawn in a direction parallel with the axis of the shaft by said links.

6. In a disintegrating machine, a casing, a cover at one end thereof, supporting toggle links connected with the cover and with the casing and arranged to hold the cover firmly against the end of the casing and to permit its removal from the casing, pivoted crank arms having a handle connected therewith for manipulating the removal of the cover, a shaft revolubly mounted in the casing and projecting from the end thereof opposite the removable cover, a fly-wheel affixed to said shaft within the casing, a rotary disk detachably fastened to the fly-wheel, said rotary disk having concentric rings of projecting teeth on the side thereof away from the fly-wheel, and a stationary disk detachably fastened to the end cover of the casing, said stationary disk having concentric rings of projecting teeth on the side thereof away from the cover arranged to be held by the cover between the rings of teeth on the rotary disk and to be withdrawn in a direction parallel with the axis of the shaft by said links.

7. In a disintegrating machine, a casing, a removable cover at one end thereof, a shaft revolubly mounted in the casing and projecting through its other end, a fly-wheel affixed to said shaft within the casing, a rotary disk fastened to the fly-wheel, said rotary disk having concentric rings of projecting teeth on the side thereof away from the fly-wheel, and a stationary disk fastened to the end cover of the casing, said stationary disk having concentric rings of projecting teeth on the side thereof away from the cover and held by the cover between the rings of teeth on the rotary disk, combined with a shearing mechanism within the teeth of the rotary and stationary disks comprising an internally-toothed stationary annular member within said stationary disk, a rotary member projecting from said shaft into the annular member and having an external screw thread arranged to feed material to said projecting teeth and a plurality of blades opposed to the inner end of the annular member the annular member of said shearing mechanism being also held by the cover in a position surrounding and adjacent to the rotary parts of said mechanism.

8. In a disintegrating machine, a casing, a removable cover at one end thereof, a shaft revolubly mounted in the casing and projecting through its other end, a fly-wheel affixed to said shaft within the casing, a rotary disk detachably fastened to the fly-wheel, said rotary disk having concentric rings of projecting teeth on the side thereof away from the fly-wheel, and a stationary disk detachably fastened to the end cover of the casing, said stationary disk having concentric rings of projecting teeth on the side thereof away from the cover and held by the cover between the rings of teeth on the rotary disk, combined with a shearing mechanism within the teeth of the rotary and stationary disks comprising an internally toothed stationary annular member within said stationary disk, a rotary member projecting from said shaft into the annular member and having an external screw thread arranged to feed material to said projecting teeth and a plurality of blades opposed to the inner end of the annular member and within said concentric rings of teeth the annular member of said shearing mechanism being also held by the cover in a position surrounding and adjacent to the rotary parts of said mechanism; and means for introducing material into the machine through said annular member.

9. In a disintegrating machine, a casing, a cover at one end thereof, supporting toggle links connected with the cover and with the casing and arranged to hold the cover firmly against the end of the casing and to permit its removal from the casing, pivoted crank arms having a handle connected therewith for manipulating the removal of the cover, a shaft revolubly mounted in the casing and projecting from the end thereof opposite the removable cover, a fly-wheel affixed to said shaft within the casing, a rotary disk detachably fastened to the fly-wheel, said rotary disk having concentric rings of projecting teeth on the side thereof away from the fly-wheel, and a stationary disk detachably fastened to the end cover of the casing, said stationary disk having concentric rings of projecting teeth on the side thereof away from the cover arranged to be held by the cover between the rings of teeth on the rotary disk and to be withdrawn in a direction parallel with the axis of the shaft by said links, combined with a shearing mechanism within the teeth of the rotary and stationary disks comprising an internally toothed stationary annular member within said stationary disk and a rotary member projecting from said shaft into the annular member having an external screw thread arranged to feed material to said projecting teeth and a plurality of blades opposed to the inner end of the annular member and within said concentric rings of teeth the annular member of said shearing mechanism being also held by the cover in a position surrounding and adjacent to the rotary parts of said mechanism; and means for introducing material into the machine through said annular member.

10. In a disintegrating machine, a casing, a removable cover at one end thereof, supporting toggle links connected with the cover and with the casing and arranged to hold the cover firmly against the end of the casing and to permit its removal from the casing in a direction parallel with the axis of rotation, a shaft revolubly mounted in the casing and projecting through its other end, a fly-wheel affixed to said shaft within the casing, a rotary disk detachably fastened to the fly-wheel, said rotary disk having concentric rings of projecting teeth on the side thereof away from the fly-wheel, and a stationary disk detachably fastened to the end cover of the casing, said stationary disk having concentric rings of projecting teeth on the side thereof away from the cover arranged to be held by the cover between the rings of teeth on the rotary disk and to be withdrawn in a direction parallel with the axis of the shaft by said links, the teeth on said disks being of progressively decreasing lengths in the rings toward the peripheries of the rings and having impact surfaces radial to the axis of rotation, combined with a shearing mechanism within the teeth of the rotary and stationary disks comprising an internally toothed stationary annular member projecting from said shaft into the annular member having an external screw thread arranged to feed material to said projecting teeth and a plurality of blades opposed to the inner end of the annular member and within said concentric rings of teeth the annular member of said shearing mechanism being also held by the cover in a position surrounding and adjacent to the rotary parts of said mechanism; and a chute affixed to the removable cover and arranged to lead material into the machine through said annular member.

Dated the first day of June, 1915.

GEORGE SEYMOUR HIGGINSON.

Witnesses:
JOHN ALFRED WILLIAMS,
FRANK KNIGHT WOODROFFE.